US012253618B2

(12) United States Patent
Hasegawa et al.

(10) Patent No.: US 12,253,618 B2
(45) Date of Patent: Mar. 18, 2025

(54) INFORMATION PROCESSING DEVICE, INFORMATION PROCESSING SYSTEM, COMPUTER-READABLE STORAGE MEDIUM, AND INFORMATION PROCESSING METHOD

(71) Applicant: SATO HOLDINGS KABUSHIKI KAISHA, Tokyo (JP)

(72) Inventors: Hiroaki Hasegawa, Tokyo (JP); Masanori Ogawa, Tokyo (JP); Kei Kitano, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 324 days.

(21) Appl. No.: 17/759,867

(22) PCT Filed: Aug. 12, 2020

(86) PCT No.: PCT/JP2020/030665
§ 371 (c)(1),
(2) Date: Aug. 1, 2022

(87) PCT Pub. No.: WO2021/176747
PCT Pub. Date: Sep. 10, 2021

(65) Prior Publication Data
US 2023/0081096 A1 Mar. 16, 2023

(30) Foreign Application Priority Data

Mar. 5, 2020 (JP) .................................. 2020-037395

(51) Int. Cl.
*G01S 5/04* (2006.01)
*G01S 5/00* (2006.01)

(52) U.S. Cl.
CPC ................ *G01S 5/04* (2013.01); *G01S 5/014* (2020.05)

(58) Field of Classification Search
CPC .................................... G01S 5/04; G01S 5/014
(Continued)

(56) References Cited

U.S. PATENT DOCUMENTS

| RE48,160 E  * | 8/2020 | Liu ...................... H04W 4/023 |
| 11,765,580 B2 * | 9/2023 | Wirola .................. H04W 12/79 |
| | | 700/66 |

(Continued)

FOREIGN PATENT DOCUMENTS

| JP | 2005-017047 A | 1/2005 |
| JP | 2010-107501 A | 5/2010 |

(Continued)

*Primary Examiner* — Harry K Liu
(74) *Attorney, Agent, or Firm* — Foley & Lardner LLP

(57) ABSTRACT

An information processing apparatus includes: a processor configured to acquire position information of a communication device; and a storage configured to store first map information and second map information. The processor is further configured to, in a case in which the processor acquires position information a predetermined number of times of at least two or more, in a first partial area of plurality of first partial areas, determine that the communication device exists in the first partial area. The processor is further configured to, in a case in which the processor acquires position information a predetermined number of times of at least two or more, in a second partial area of plurality of second partial areas, determine that the communication device exists in the second partial area.

21 Claims, 14 Drawing Sheets

(58) Field of Classification Search
USPC .......................................................... 342/450
See application file for complete search history.

(56) References Cited

U.S. PATENT DOCUMENTS

| | | | |
|---|---|---|---|
| 12,058,535 B2 * | 8/2024 | Friday ................... | H04W 4/021 |
| 2004/0267495 A1 | 12/2004 | Manzen | |
| 2010/0090899 A1 | 4/2010 | Zhao et al. | |
| 2016/0192314 A1 | 6/2016 | Leppanen et al. | |
| 2018/0020421 A1 | 1/2018 | Kumar et al. | |
| 2018/0067187 A1 * | 3/2018 | Oh ........................ | H04W 64/00 |

FOREIGN PATENT DOCUMENTS

| | | | | |
|---|---|---|---|---|
| JP | 2015-514969 A | | 5/2015 | |
| JP | 2017-156260 A | | 9/2017 | |
| JP | 2018-512571 A | | 5/2018 | |
| KR | 2682205 B1 * | 7/2024 | ............. | G01S 5/014 |

\* cited by examiner

| NAME OF AREA | AREA ID | REFERENCE POSITION Ref | | Lx | Ly | SAC |
|---|---|---|---|---|---|---|
| | | X | Y | | | |
| A3-12 | **** | -3 | 3 | 13 | 4 | 3 |
| ⋮ | ⋮ | ⋮ | ⋮ | ⋮ | ⋮ | ⋮ |

| DEVICE ID : 00028 | | |
|---|---|---|
| TIME OF OCCURRENCE OF EVENT | EVENT TYPE | AREA ID |
| 2020.10.8 13:21:03 | IN | A12 |
| 2020.10.8 13:22:12 | OUT | A12 |
| 2020.10.8 13:22:12 | IN | A13 |
| ⋮ | ⋮ | ⋮ |

FIG.7

FOR EDGE DEVICES OTHER THAN L1 EDGE DEVICE

FOR L1 EDGE DEVICE FIG.9

FIG.10 FOR EDGE DEVICES OTHER THAN L1 EDGE DEVICE

FOR EDGE DEVICES OTHER THAN L1 EDGE DEVICE

| TIME | EVENT | |
|---|---|---|
| | A3-1 | A4-1 |
| t1 | | |
| t2 | | |
| t3 | IN | |
| t4 | | |
| t5 | | |
| t6 | | |
| t7 | | IN |
| t8 | | |

OVERLAP OF AREAS IS ALLOWED

| TIME | EVENT | |
|---|---|---|
| | A3-1 | A4-1 |
| t1 | | |
| t2 | | |
| t3 | IN | |
| t4 | | |
| t5 | | |
| t6 | | |
| t7 | OUT | IN |
| t8 | | |

OVERLAP OF AREAS IS NOT ALLOWED

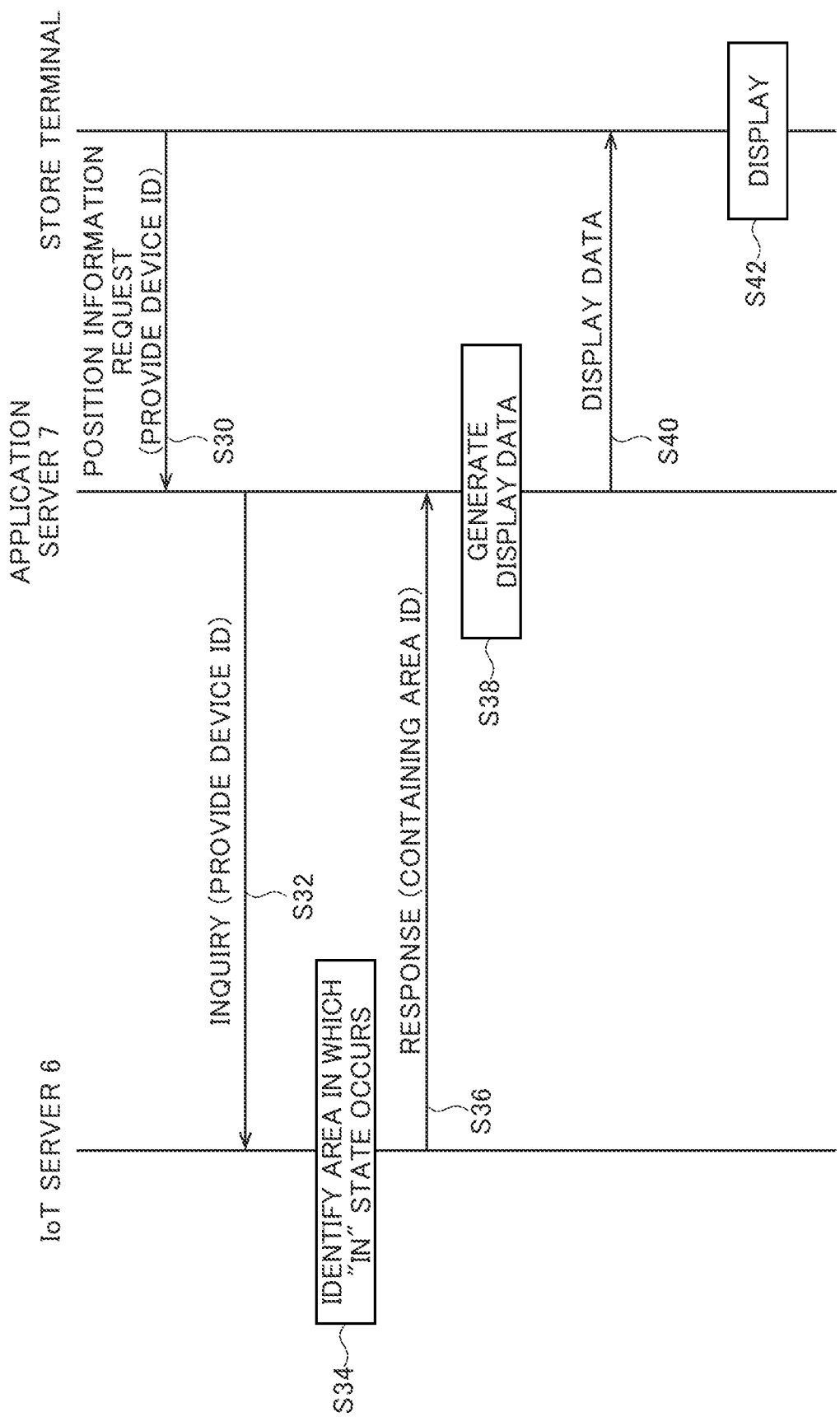

INFORMATION PROCESSING DEVICE, INFORMATION PROCESSING SYSTEM, COMPUTER-READABLE STORAGE MEDIUM, AND INFORMATION PROCESSING METHOD

FIELD

The present invention relates to an information processing apparatus, an information processing system, a computer-readable storage medium, and an information processing method.

BACKGROUND

Various methods have been developed heretofore in order to improve positioning accuracy in measuring positions of communication devices.

In one example, Japanese Unexamined Patent Application Publication No. 2005-17047 discloses a method of performing a statistical process on a positioning result corresponding to a current position having a positioning function. This statistical process is performed on positioning results of past "n" times, as follows: For results of 1st to (m−1)th positioning, the result of first positioning is output as it is, the results of second to (m−1)th positioning are averaged, and this average is then output. For results of mth and subsequent processing, the results of (n-m)th to nth positioning are averaged, and this average is then output. Thus, positioning accuracy is improved.

BRIEF SUMMARY

Technical Problem

The positioning accuracy of a communication device can greatly affect depending on surrounding environment and so on. Particularly in indoor spaces, positioning accuracy of a communication device varies due to fluctuations of radio waves at the time of measuring a position, depending on a situation of radio wave interference in a floor and a positional relationship between the communication device and a positioning device. In particular, a communication device that exists beside a wall or a window tends to be positioned with degraded accuracy.

In view of this, an object of the present invention is to enhance reliability of position information of a communication device in measuring a position of the communication device.

Solution to Problem

One aspect of the present invention provides an information processing apparatus including a position information acquisition unit, a storage, and a determination unit. The position information acquisition unit is configured to acquire position information of a communication device. The storage is configured to store first map information and second map information. The first map indicates a plurality of first partial areas that divide an area in which the communication device is movable. The second map information indicates a plurality of second partial areas that divide the area. The second partial areas are smaller than the first partial areas. The determination unit is configured to, in a case in which the position information acquisition unit acquires position information a predetermined number of times of at least two or more, in one of the plurality of first partial areas in the first map information, determine that the communication device exists in the first partial area. The determination unit is further configured to, in a case in which the position information acquisition unit acquires position information a predetermined number of times of at least two or more, in one of the plurality of second partial areas in the second map information, determine that the communication device exists in the one second partial area.

Advantageous Effects

The one aspect of the present invention enables enhancing reliability of position information of a communication device in measuring a position of the communication device.

BRIEF DESCRIPTION OF DRAWINGS

FIG. 7 shows an example of data components of an event database.

FIG. 13 is an example of a sequence chart showing operation of the positioning system of the embodiment.

DETAILED DESCRIPTION

The present invention is related to Japanese Patent Application No. 2020-37395 filed with the Japan Patent Office on Mar. 5, 2020, the entire contents of which are incorporated into this specification by reference.

(1) System Configuration

Hereinafter, a positioning system 1 of an embodiment of an information processing system will be described with reference to the drawings.

The positioning system 1 is a system of continuously measuring a position of a communication device in an indoor space based on radio waves that are emitted by the communication device. This embodiment describes an example in which the positioning system 1 is installed in a store that serves food and drink.

Figure 1:
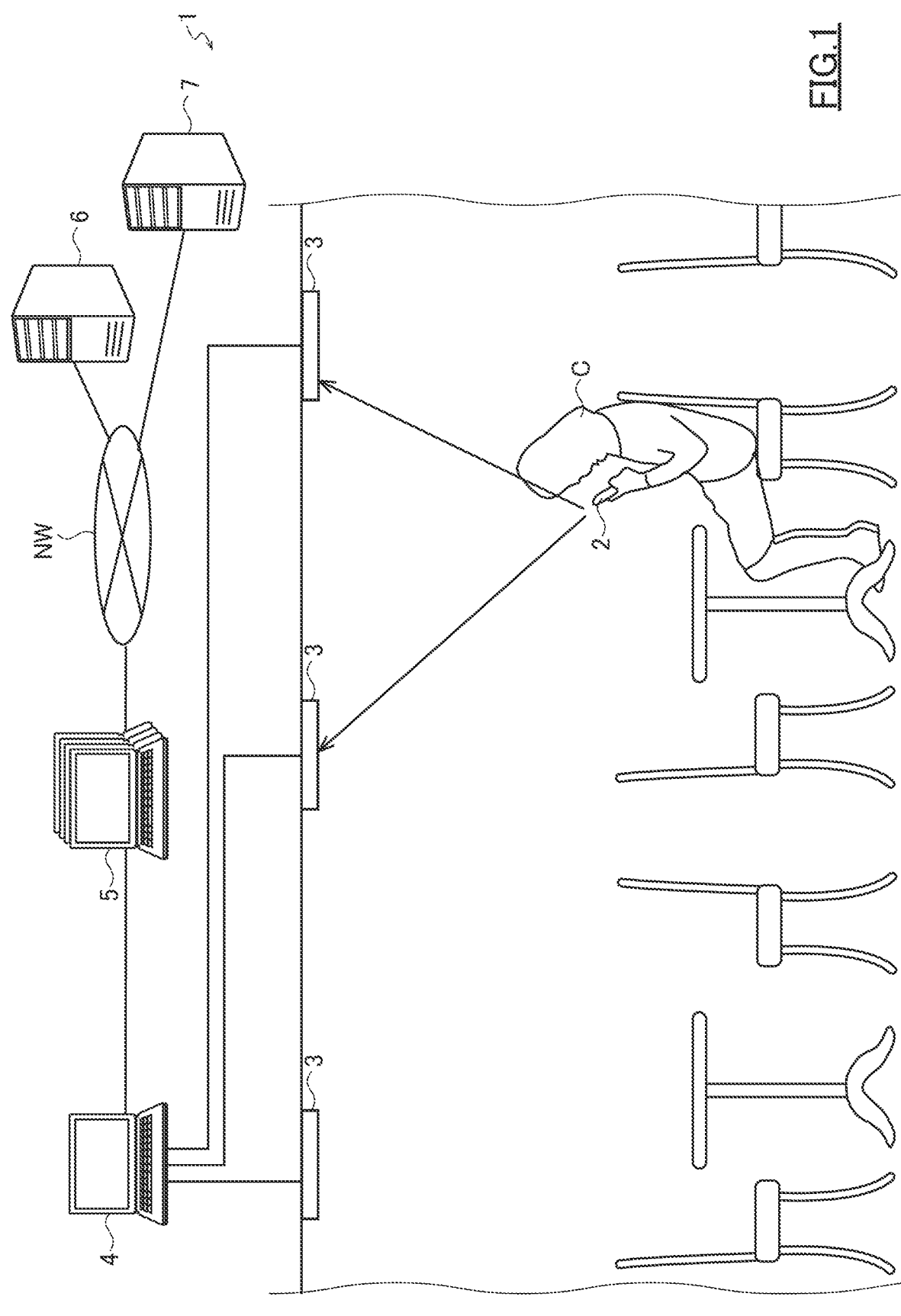
FIG. 1 shows a system configuration of a positioning system of an embodiment.

FIG. 1 shows a system configuration of the positioning system of the embodiment. FIG. 1 shows a communication device 2 that is a communication device carried by a customer "C". The communication device 2 can use any type of device that is configured to transmit a radio wave for positioning. The following description assumes a communication terminal of the customer "C", such as a smartphone or a tablet, as the communication device 2. However, the communication device 2 is not limited thereto, and a radio tag that is lent to the customer "C" from a store at the time of ordering may be used.

The store illustrated in FIG. 1 is operated as follows.

The customer "C" enters the store and orders food and drink through a customer application that is installed in the communication device 2 after or before taking a seat. A worker of the store does not come to take an order, and an order that is made through the customer application is processed by an application server 7.

The worker of the store has a store communication terminal (not shown) in which a store application is installed. Upon executing the store application, the store communication terminal acquires information about the order of the customer "C" from the application server 7 and provides the position of the customer "C" in the store floor. Specifically, the positioning system 1 of this embodiment continuously measures the position of the communication device 2 of the customer "C" and enables the store communication terminal to acquire a current position of the customer "C" (which is a current position of the communication device 2) from the application server 7. With this configuration, the worker of the store can know the position at which the customer "C" takes a seat and can directly deliver food and drink ordered by the customer "C", to the seat of the customer "C". This ordering system eliminates the need for the customer "C" to place an order at a predetermined counter and to go to receive the ordered food and drink at a predetermined spot.

In the case of using a radio tag as the communication device 2, a worker of the store lends the radio tag, for example, when receiving an order from the customer "C" at a predetermined spot, and the positioning system 1 of this embodiment continuously measures the position of the radio tag in the store floor. With this configuration, the worker of the store can directly deliver the food and drink ordered by the customer "C", to the seat of the customer "C", in the same manner.

With reference to FIG. 1, a receiver 3 (locator) and a position identification device 4 are communicably connected to each other and constitute a position identification system for identifying a position of the communication device 2 in the store. The receiver 3 is installed, for example, on a ceiling of the store. The receiver 3 receives a radio wave (beacon signal) that is emitted from the communication device 2 carried by the customer "C" who moves in the store, and it measures an incident angle of the radio wave. The position identification device 4 measures a position of the communication device 2 by using an angle-of-arrival (AOA) method for identifying a position (position in a plane) of the communication device 2 in the store based on an incident angle, which is measured by the receiver 3. The receiver 3 may be installed on a ceiling space side, unlike the case in FIG. 1.

In a non-limiting example, communication between the communication device 2 and the receiver 3 is made by Bluetooth Low Energy (registered trademark; hereinafter abbreviated as "BLE", as appropriate).

The position of the communication device 2 can be estimated only by one receiver 3. However, from the point of view of enhancing positioning accuracy, it is preferable to install more receivers 3 in accordance with the degree of a received signal strength indicator (RSSI) of a beacon signal that is transmitted from the communication device 2, a store floor area, and a radio wave environment in the store. The method of positioning the communication device 2 is not limited to the AOA method, and another method, such as a time-of-arrival (TOA) method, may be used.

The communication device 2 that executes the customer application functions as a BLE tag. In this state, the communication device 2 transmits a beacon signal that contains a device ID for identifying the communication device 2. The position identification system identifies the communication device 2, based on the device ID contained in the beacon signal. Alternatively, a unique device ID may be assigned to the customer application that is installed in the communication device 2, and the communication device 2 may be identified based on this device ID. In the case of using a radio tag as the communication device 2, the radio tag, which is the communication device 2, is identified based on a unique tag ID that is stored in a storage of the radio tag.

An edge server 5 manages the position of the customer "C" in terms of store maps of a plurality of layers (an example of map information) set to the whole area of the store.

Figure 2:
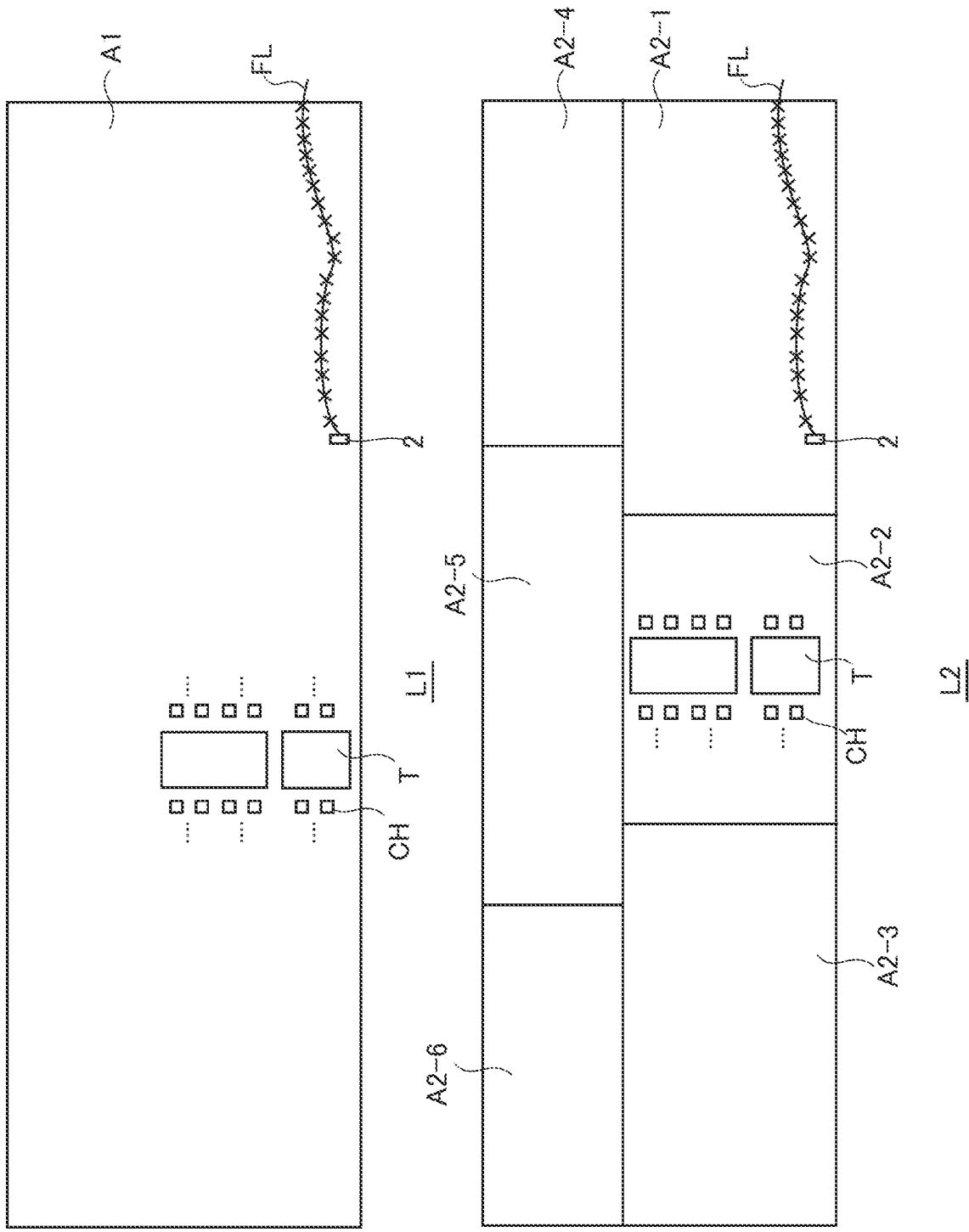
FIG. 2 shows exemplary store maps of first and second layers.
Figure 3:
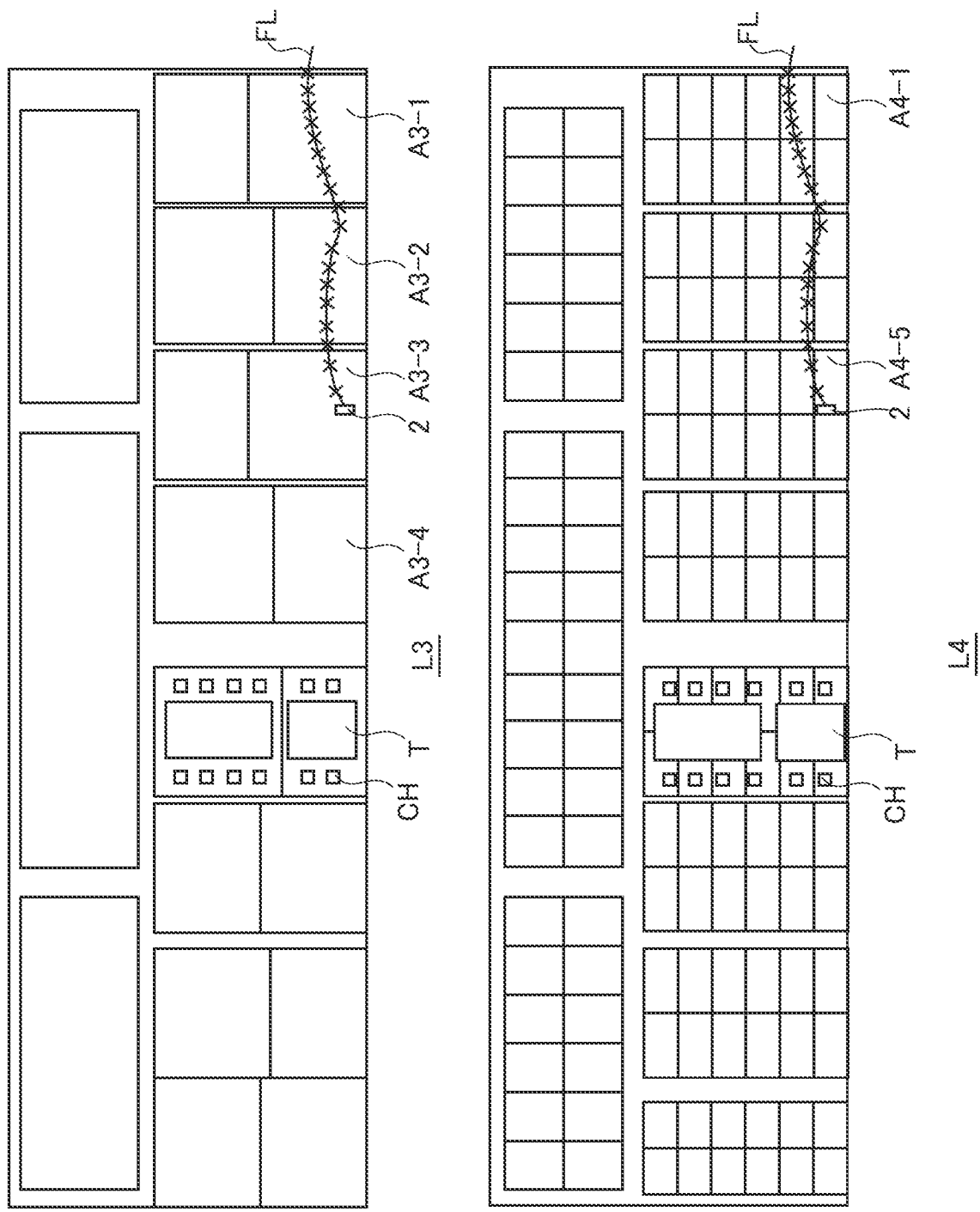
FIG. 3 shows exemplary store maps of third and fourth layers.

Herein, examples of the store maps of the plurality of layers will be described with reference to FIGS. 2 and 3. FIG. 2 shows exemplary store maps of layers L1 and L2. FIG. 3 shows exemplary store maps of layers L3 and L4. In these examples, the store map of each layer has an outermost frame that corresponds to the dimensions of the whole store floor. Each of the layers L1 to L4 is divided into a plurality of partial areas, and the partial areas (hereinafter simply called "areas") become smaller from the layer L1 to the layer L4. The illustrations show each area that is rectangular, but the shape of each area is not limited thereto. The outline of each area can be any shape.

In one example, the store maps of the layers L2 and L3 are examples of first map information and second map information, respectively. The store maps of the layers L3 and L4 are examples of first map information and second map information, respectively.

As shown in FIG. 2, the store map of the layer L1 includes an area A1. The area A1 has a size equal to the dimensions of the whole store floor. The store map of the layer L2 includes a plurality of divided areas of A2-1, A2-2, . . . , and A2-6 that are smaller than the area A1. As shown in FIG. 3, the store map of the layer L3 includes a plurality of divided areas of A3-1, A3-2, A3-3, A3-4, and . . . that are smaller than the areas A2-1, A2-2, . . . , and A2-6.

The store map of the layer L4 includes a plurality of divided areas of A4-1, and . . . , each of which is smaller than each of the areas A3-1, A3-2, . . . , and A3-6. The store map is represented as seen from a point above the store, so as to enable understanding positions of tables, chairs, etc., in accordance with the store layout. Each area that is included in the store map of the layer L4 is the smallest unit of the area, and it corresponds to, for example, a region of one chair CH that is placed in the store. Each area that is included in the store map of the layer L3 corresponds to a region of a group composed of one table "T" and a plurality of chairs CH surrounding this table "T". Each area that is included in the layer L2 store map corresponds to a region composed of a plurality of tables "T" and a plurality of chairs CH. In the example of the store map of the layer L4 in FIG. 3, the area A4-1 corresponds to a region of one chair CH.

In the case in which the store maps of the layers L2 and L3 are examples of first map information and second map information, respectively, the areas A2-1, A2-2, and . . . is an example of a plurality of first partial areas, and the areas A3-1, A3-2, and . . . is an example of a plurality of second partial areas. In the case in which the store maps of the layers L3 and L4 are examples of first map information and second map information, respectively, the areas A3-1, A3-2, and . . . is an example of a plurality of first partial areas, and the areas A4-1 and . . . is an example of a plurality of second partial areas.

In the examples in FIGS. 2 and 3, the areas of the store maps of the layers have inclusion relations. In one example, the area A3-1 of the store map of the layer L3 includes the area A4-1 and a plurality of areas in proximity to the area A4-1 of the store map of the layer L4. The area A2-1 of the store map of the layer L2 includes the area A3-1 and a plurality of areas in proximity to the area A3-1 of the store map of the layer L3. The area A1 of the store map of the layer L1 includes the areas A2-1 to A2-6 of the store map of the layer L2.

However, the areas of the store maps of the layers may not be in an inclusion relation. For example, a store map of a certain layer may include an area that does not overlap the area of the store map of another layer.

The store maps of the layers L1 to L4 in FIGS. 2 and 3 show an exemplary flow line FL of the communication device 2. The flow lines FL in the store maps are the same, and the "x" mark schematically represents a position that is measured.

The position of the communication device 2 can be accurately measured by identifying the area where the communication device 2 exists, in the store map of the layer L4 that is divided into smallest areas. However, positioning accuracy of the communication device 2 varies depending on the position of the communication device 2 in the store. This is because it is difficult to make a uniform propagation environment of radio waves in the store due to the layout of the store, placed positions of the receivers 3, and so on. The store map of the layer L4, which is divided into smallest areas, can cause the following wrong determination. That is, when the measured position even slightly deviates from the actual position of the communication device due to fluctuations of radio waves and so on, the position of the communication device is measured in another area and is determined as existing in the another area. Thus, the area where the communication device 2 exists may not be accurately identified in some cases.

In consideration of this, in response to detection that the communication device 2 exists in the same area, a predetermined number of times, in the store map of each layer, the positioning system 1 of this embodiment determines that the communication device 2 exists in the corresponding area. With this process, in a situation in which local deterioration in propagation environment in the store prevents determining the position of the communication device 2 in the area A4-5 of the layer L4 in the example in FIG. 3, the communication device 2 can be determined as existing in the area A3-3 of the layer L3, which includes the area A4-5. In more detail, although not detected a predetermined number of times in the small range of the area A4-5, the position can be detected the predetermined number of times in the area A3-3 that is larger than the area A4-5, even when reception environment is deteriorated in the area A3-3 such that radio waves between the communication device 2 and the receiver 3 fluctuate. In short, as the layer is changed from the layer L1 to the layer L4, the position of the communication device 2 becomes difficult to detect in a certain area a predetermined number of times, but it can be more accurately measured. Conversely, as the layer is changed from the layer L4 to the layer L1, the dimensions of the areas are larger, and the position of the communication device 2 becomes easy to detect in a certain area a predetermined number of times; however, accuracy of the position of the communication device 2 informed to a worker of the store tends to be decreased.

The following describes a number of times of detection (the predetermined number of times described above), which is a basis of determining that the communication device 2 exists in the same area, as a "detection set value", as appropriate. The detection set value can be set to any value of two or more.

The positioning system 1 of this embodiment determines which area the communication device 2 exists in, based on the detection set value, in the store maps of the plurality of layers that include areas having different dimensions. Thus, the position of the communication device 2 is measured with high accuracy when propagation environment of radio waves is good. Meanwhile, even when propagation environment of radio waves is not very good, it is possible to show a range where the communication device 2 certainly exists, although accuracy (resolution) is relatively low.

The detection set value may be set differently depending on the layer or the area.

The edge server 5 detects an IN event (an example of an entering event) and an OUT event (an example of a leaving event) of the communication device 2 at each area in the store map of each layer, and it transmits this information to an IoT server 6.

The IN event is an event in which the communication device 2 enters a target area from another area. The OUT event is an event in which the communication device 2 leaves a target area to another area. The examples in FIG. 2 show an occurrence of an IN event at the area A1 in the store map of the layer L1 and an occurrence of an IN event at the area A2-1 in the store map of the layer L2. The examples in FIG. 3 show occurrences of an IN event and an OUT event at the area A3-1, occurrences of an IN event and an OUT event at the area A3-2, and an occurrence of an IN event at the area A3-3.

With reference again to FIG. 1, the IoT server 6 is a network server that is communicable with the edge server 5 via a network NW. The IoT server 6 includes an event database for recording an IN event and an OUT event at each area, which events are detected by the edge server 5. The IoT server 6 also includes an application programming interface (API) for responding to an inquiry from the application server 7.

The application server 7 is a server that executes processes in accordance with a request from the customer application of the communication device 2 and from the store application of the store communication terminal (not shown) and then returns an execution result to each application.

For example, upon receiving an order from the customer application of the communication device 2, the application server 7 stores the device ID and the order data showing the ordered content in an associated manner so as to enable the store application to access the order data corresponding to the device ID. In addition, the application server 7 returns, to the store application, display data containing position information of the communication device 2 of the device ID corresponding to the order data, in response to a request (which is a position information request described later) from the store application.

Figure 4:
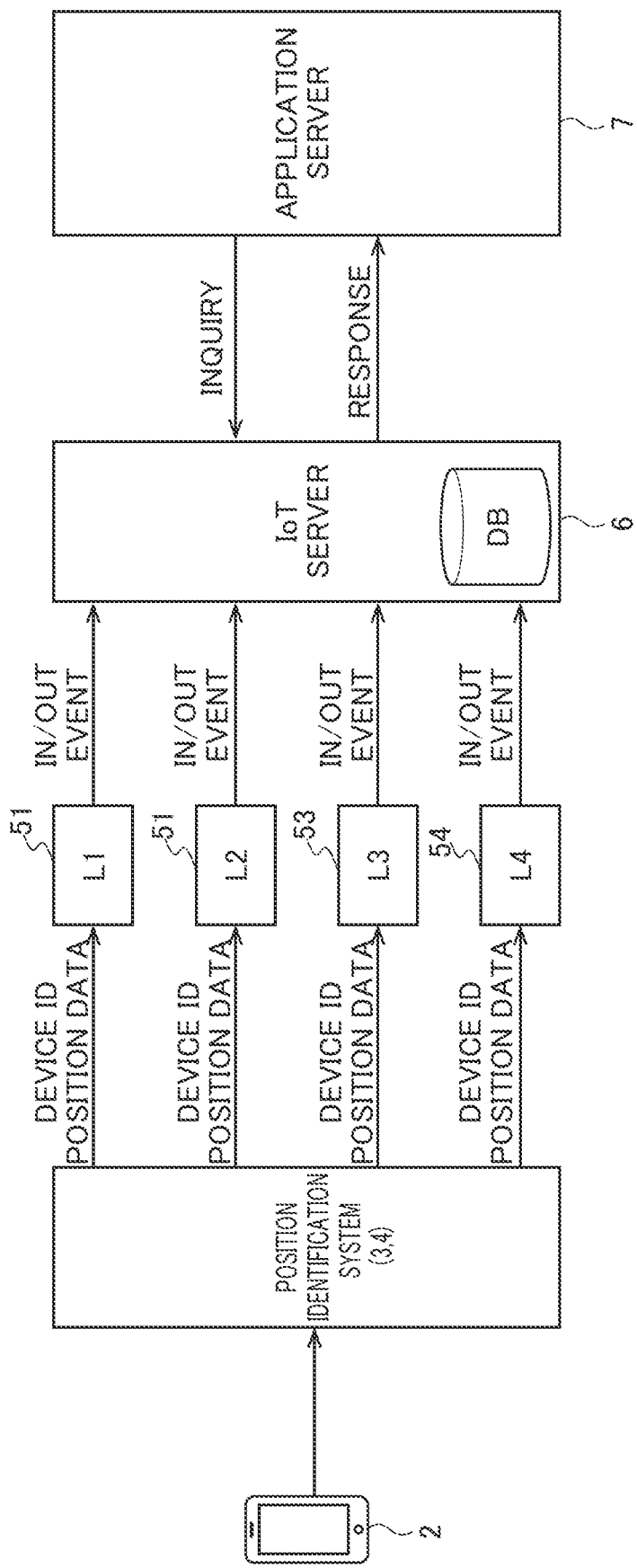
FIG. 4 illustrates an overview of processing of the positioning system of the embodiment.

FIG. 4 illustrates an overview of processing of the positioning system 1 of this embodiment. Note that FIG. 4 shows a position identification system that stands for both of the receiver 3 and the position identification device 4.

In this embodiment, the edge server 5 includes four edge devices comprised of: L1 edge device 51, L2 edge device 52, L3 edge device 53, and L4 edge device 54 that manage the store maps of the layers L1 to L4 assigned respectively, but configuration of the edge server 5 is not limited thereto. The functions of a plurality of edge devices can be implemented by one device. That is, one edge device may be configured to store the store maps of the layers L1 to L4 and to execute the processing of each of the L1 edge device 51, the L2 edge device 52, the L3 edge device 53, and the L4 edge device 54, which will be described below.

The position identification system in FIG. 4 sequentially measures the position of the communication device 2 based on a beacon signal that is received from the communication device 2 carried by a customer. The position identification system transmits the device ID of the communication device 2 and the obtained position data, to the L1 edge device 51, the L2 edge device 52, the L3 edge device 53, and the L4 edge device 54 of the edge server 5. The device ID and the position data are transmitted, for example, by using a user datagram protocol (UDP), but the protocol is not limited thereto.

The L1 edge device 51, the L2 edge device 52, the L3 edge device 53, and the L4 edge device 54 manage the store maps of the layers L1 to L4, respectively. Upon detecting an IN event and an OUT event at each area in the store map of the management target layer, they transmit the detected event to the IoT server 6.

The IoT server 6 includes an event database and updates the event database based on the IN event and the OUT event transmitted from each edge device of the edge server 5. Moreover, upon receiving an inquiry that specifies a device ID, from the application server 7, the IoT server 6 returns information for identifying the area where the communication device 2 corresponding to the device ID is in an IN state, to the application server 7, as a response. In addition, as necessary, information for identifying an area where an OUT state occurs may be returned to the application server 7, or information for identifying areas where the IN state or the OUT state occurs may be returned to the application server 7.

(2) Configuration of Each Section of System

Next, an internal configuration of each section of the positioning system 1 of this embodiment will be described with reference to FIGS. 5 to 7.

Figure 5:
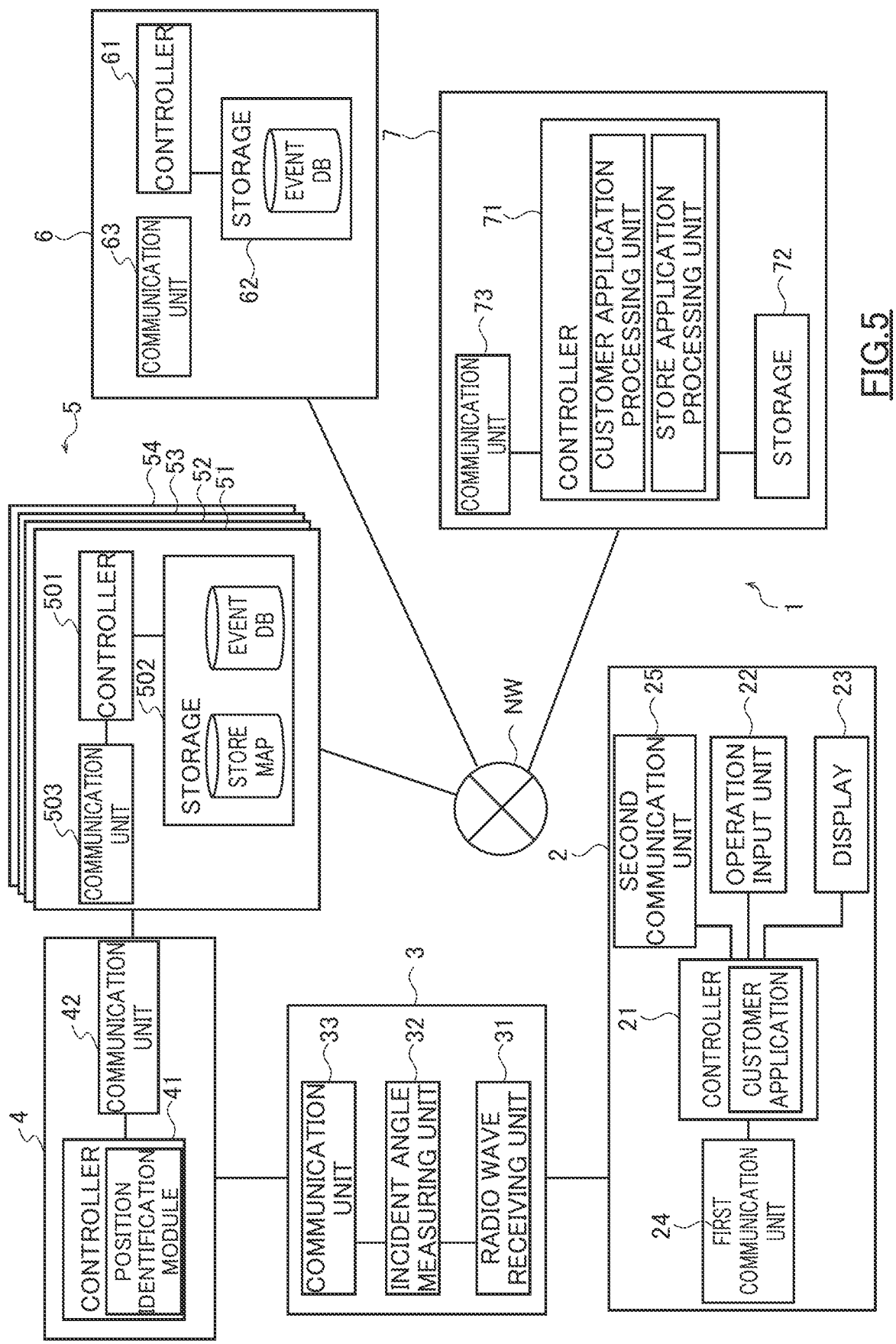
FIG. 5 is a block diagram showing an internal configuration of each device of the positioning system of the embodiment.

FIG. 5 is a block diagram showing an internal configuration of each device of the positioning system 1 of this embodiment.

As shown in FIG. 5, the communication device 2 includes a controller 21, an operation input unit 22, a display 23, a first communication unit 24, and a second communication unit 25.

The controller 21 is composed mainly of a microprocessor and controls the whole communication device 2. In one example, the microprocessor of the controller 21 loads and executes the customer application to perform a transmission process of a beacon signal and an order process of food and drink that are available in the store. The order process involves transmitting order data showing an ordered content, in association with the device ID, to the application server 7. In the case of using a radio tag as the communication device 2, the communication device 2 transmits order data in association with a tag ID unique to the radio tag, to the application server 7.

The operation input unit 22 is an input interface that receives operation input from a user who operates to execute each program, and it may be a touch panel input unit provided to a display panel of the display 23.

The display 23 includes a display panel, such as a liquid crystal panel (LCD), and a driving circuit of the display panel. For example, the display 23 shows results of the customer application executed by the controller 21.

The first communication unit 24 wirelessly communicates with a target object, for example, in a communication range smaller than that of the second communication unit 25, and it emits a beacon signal, for example, according to the BLE protocol. The beacon signal contains the device ID for identifying the communication device 2.

The second communication unit 25 is a communication interface for communicating with the application server 7 via the network NW.

As shown in FIG. 5, the receiver 3 includes a radio wave receiving unit 31, an incident angle measuring unit 32, and a communication unit 33.

The radio wave receiving unit 31 includes an antenna for receiving a beacon signal (radio wave) that is transmitted from the communication device 2.

The incident angle measuring unit 32 measures an incident angle of a radio wave that is received from the communication device 2 by the radio wave receiving unit 31.

The communication unit 33 is an interface for communicating with the communication device 2 and the position identification device 4. In one example, the communication unit 33 demodulates the reception signal from the communication device 2. In addition, the communication unit 33 transmits information of the incident angle, which is measured by the incident angle measuring unit 32, in association with the device ID, to the position identification device 4. The communication between the receiver 3 and the position identification device 4 can be wired or wireless.

As shown in FIG. 5, the position identification device 4 includes a controller 41 and a communication unit 42.

The controller 41 is composed mainly of a microprocessor and controls the whole position identification device 4. In one example, the microprocessor of the controller 41 executes a position identification module (software) to identify the position of the communication device 2 based on information of an incident angle of the beacon signal, which is received from the receiver 3. More specifically, in the case of using the AOA method, the position in the store area (XY-coordinate position in the store floor) of the communication device 2 in accordance with the lapse of time is identified (measured) based on a known position in the store of the receiver 3 and on information of the incident angle of the communication device 2, as described above. The known position is a three-dimensional coordinate position relative to a predetermined position in the store. The incident angle represents an arrival direction of a radio wave and is sequentially obtained from the receiver 3.

The controller 41 includes, for example, a real-time clock as a time counting means. The controller 41 sequentially transmits position data showing the identified position of the communication device 2, information of the time when the position is measured (positioning time), and the device ID of the communication device 2, in an associated manner, to each edge device of the edge server 5 via the communication unit 42. Although being able to be freely set, the interval of positioning the communication device 2 is set to a time necessary to accurately understand the position of the communication device 2 (e.g., several hundreds of milliseconds or less).

As described above, the edge server 5 includes the L1 edge device 51, the L2 edge device 52, the L3 edge device 53, and the L4 edge device 54. As shown in FIG. 5, the components of hardware of the edge devices are approximately the same, and each edge device includes a controller 501, a storage 502, and a communication unit 503.

The controller 501 is composed mainly of a microprocessor and executes an event detection program for detecting an event of the communication device 2 at each area of the assigned layer, based on information of the positioning time, the device ID, and the position data, which are sequentially obtained from the position identification device 4. The controller 501 that executes the event detection program functions as a position information acquisition unit and a determination unit.

The position information acquisition unit continuously acquires the position data of the communication device 2 at intervals of several hundreds of milliseconds, for example. It may be detected that the communication device 2 exists in one of the plurality of areas in one of the store maps of the plurality of layers, the number of times based on the detection set value (an example of a predetermined number of times of at least two or more), based on the position data acquired by the position information acquisition unit. In response to this, the determination unit determines that the communication device 2 exists in the corresponding area.

Each edge device may include a real-time clock and may perform processing on the device ID and the position data, which are sequentially acquired from the position identification device 4, while associating them with the time of reception of the position data.

The controller 501 may function as an output unit that outputs information of the event type of at least one of the IN event and the OUT event at one of the plurality of areas, and information of the time of occurrence of the event, in an associated manner, based on a result of determination performed by the determination unit. In one example, the information of the event type and the time of occurrence of the event is transmitted (output), for example, to the IoT server 6, whereby the IoT server 6 can centrally manage the events that occur in the store maps of the plurality of layers. The time of occurrence of the event is a positioning time when the communication device 2 existing in a certain area is detected the number of times based on the detection set value. That is, the time of occurrence of the event is a time when the communication device 2 is determined as existing in a certain area.

After an IN event at a certain area is determined, the communication device 2 may continuously exist in this area (that is, the IN state may continue). In this case, the IN event at this area is not further determined.

The function of the output unit is not limited to outputting of the information of the event type and the information of the time of occurrence of the event in an associated manner. The output unit may output only the information of the event type. In this case, the IoT server 6 records the information of the event type in association with the time of reception thereof, in the event database.

The processing (event detection processing) that is performed by executing the event detection program will be described later.

The storage 502 is, for example, a mass storage device, such as a hard disk drive (HDD). The storage 502 stores an event database (event DB) that contains information of times of occurrences of the IN event and the OUT event at each area of the assigned layer, per device ID.

The storage 502 also stores the store map of the assigned layer. The store map of each layer is information of the store floor (an example of a whole area) in which the communication device 2 is movable and which is divided by a plurality of areas (examples of partial areas). The plurality of areas have dimensions different between the store maps of the layers. Specifically, the storage 502 of the L1 edge device 51 stores the store map of the layer L1, the storage 502 of the L2 edge device 52 stores the store map of the layer L2, the storage 502 of the L3 edge device 53 stores the store map of the layer L3, and the storage 502 of the L4 edge device 54 stores the store map of the layer L4.

The communication unit 503 is a communication interface for communicating with the IoT server 6 and transmits an IN event or an OUT event to the IoT server 6 each time it occurs.

Note that the phrase "transmit (record) an event" in the following description means transmission (recording) of information of the event type (IN or OUT), the area ID (described later) for identifying the area where the event occurs, and the time of occurrence of the event.

Figures 6A, 6B:
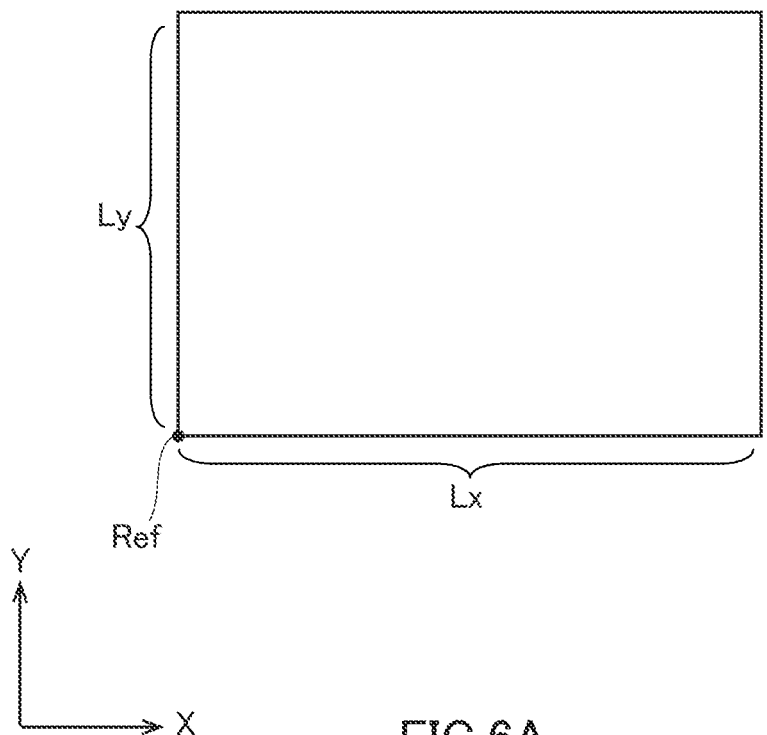
FIGS. 6A and 6B show an example of data components of the store map.

With reference to FIGS. 6A and 6B, an example of data components of the store map is shown.

Assuming that an area is represented by an exemplary rectangular shape, as shown in FIG. 6A, data components of this area are those shown in FIG. 6B. In this example of the data components, data for one area included in the store map include the name of the area, the area ID for identifying the area, a reference position Ref (XY coordinates) of the area having an origin at a predetermined position in the store floor, a length Lx in an X-axis direction from the reference position Ref, a length Ly in a Y-axis direction from the reference position Ref, and a detection set value SAC.

With reference to FIG. 7, an example of data components of the event database is shown.

Each record of the event database includes data of each field of the time of occurrence of the event, the type of the event, and the area ID, per device ID. The records are arranged in the order of the time of occurrence of the event. The data in the "EVENT TYPE" field shows the IN event or the OUT event. The data in the "AREA ID" field is an area ID corresponding to the area where the IN event or the OUT event occurs.

With reference again to FIG. 5, the IoT server 6 includes a controller 61, a storage 62, and a communication unit 63.

The controller 61 is composed mainly of a microprocessor and controls the whole IoT server 6. In one example, the microprocessor of the controller 61 updates the event database, which is stored in the storage 62, based on the IN event and the OUT event received from each edge device of the edge server 5.

The storage 62 is, for example, a mass storage device, such as an HDD. The event database that is stored in the storage 62 contains all of the event databases for the respective layers stored in the corresponding edge devices of the edge server 5. That is, the IoT server 6 centrally manages the IN event and/or the OUT event at each area of all of the layers.

The communication unit 63 is a communication interface for communicating with the application server 7.

The controller 61 includes an API for responding to an inquiry from the application server 7. Upon receiving an inquiry that specifies a device ID, from the application server 7, the API of the controller 61 refers to the event database of the storage 62 and returns information for identifying the area where the IN state of the corresponding device ID occurs last.

As shown in FIG. 5, the application server 7 includes a controller 71, a storage 72, and a communication unit 73.

The controller 71 is composed mainly of a microprocessor and controls the whole application server 7. The microprocessor executes each program, whereby the controller 71 functions as, for example, a customer application processing unit and a store application processing unit. The customer application processing unit and the store application processing unit respectively communicate with the customer application of the communication device 2 and the store application of the store communication terminal via the communication unit 73, to execute processes requested from the respective applications.

In one example, upon receiving a device ID and order data from the customer application, the customer application processing unit executes a predetermined order process (including notification of generation of an order, to the store, and an accounting process). The customer application processing unit is able to receive orders from a plurality of customers and processes the order data in association with each of different device IDs. In the case of using a radio tag as the communication device 2, the customer application processing unit executes the order process based on a tag ID and order data received from the communication device 2. The customer application processing unit associates the device ID or the tag ID, with the order data, so as to recognize which item each of a plurality of customers has ordered.

Upon receiving a position information request that specifies the device ID, from the store application, the store application processing unit generates display data that shows the position of the communication device 2 corresponding to the device ID, and it then returns it to the store application. This display data is data for showing both of the device ID and the position of the communication device 2, on the store communication terminal.

The storage 72 is, for example, a mass storage device, such as an HDD. The storage 72 stores, for example, an order database (not shown) containing the device ID and the order data, and authentication data for performing authentication processes of the customer application and the store application.

(3) Operation of Edge Server 5

Next, operation of the edge server 5 of the positioning system 1 of this embodiment will be described with reference to FIGS. 8 to 12.

Figure 8:
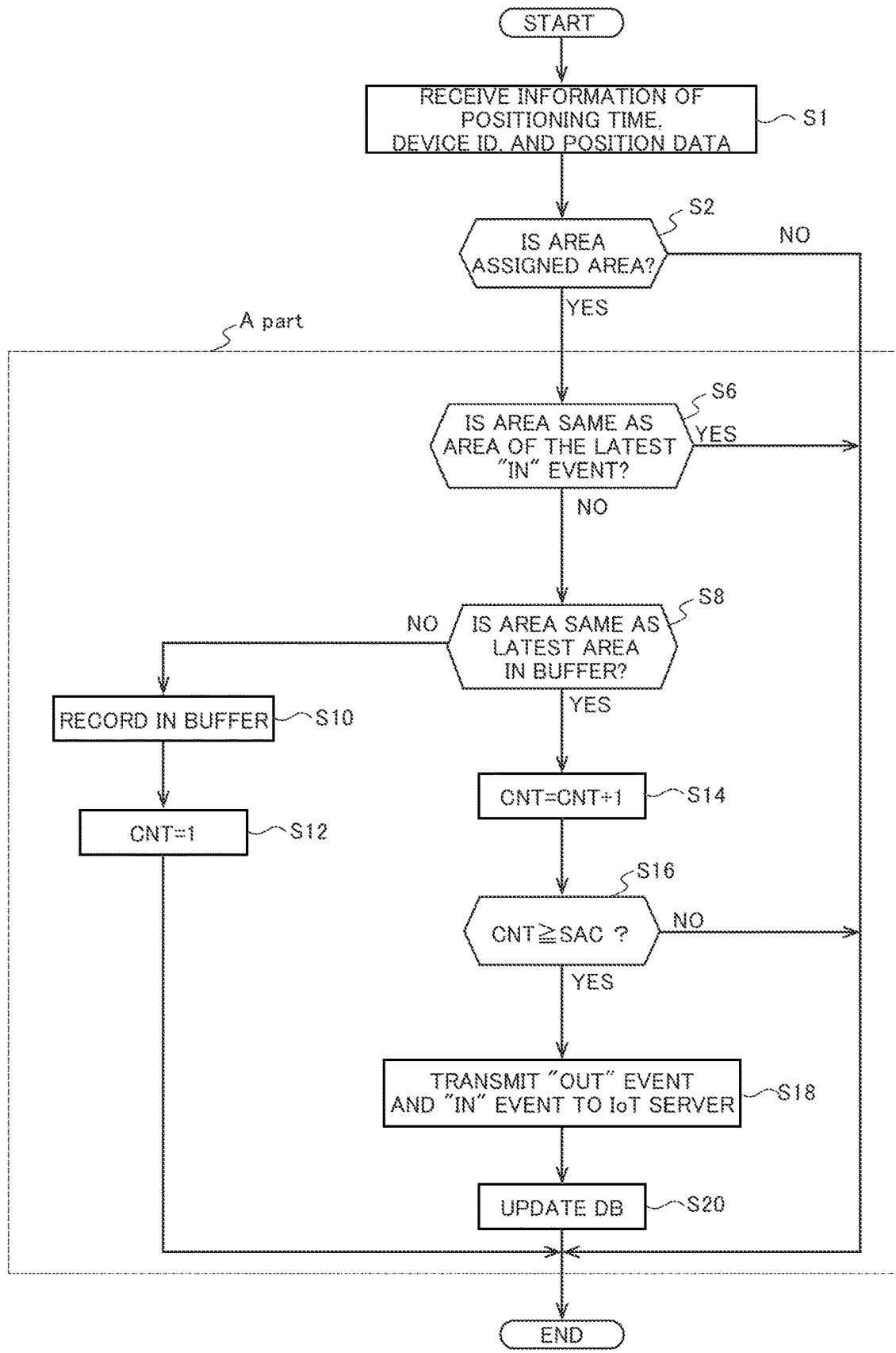
FIG. 8 is an exemplary flowchart of event detection processing.
Figure 9:
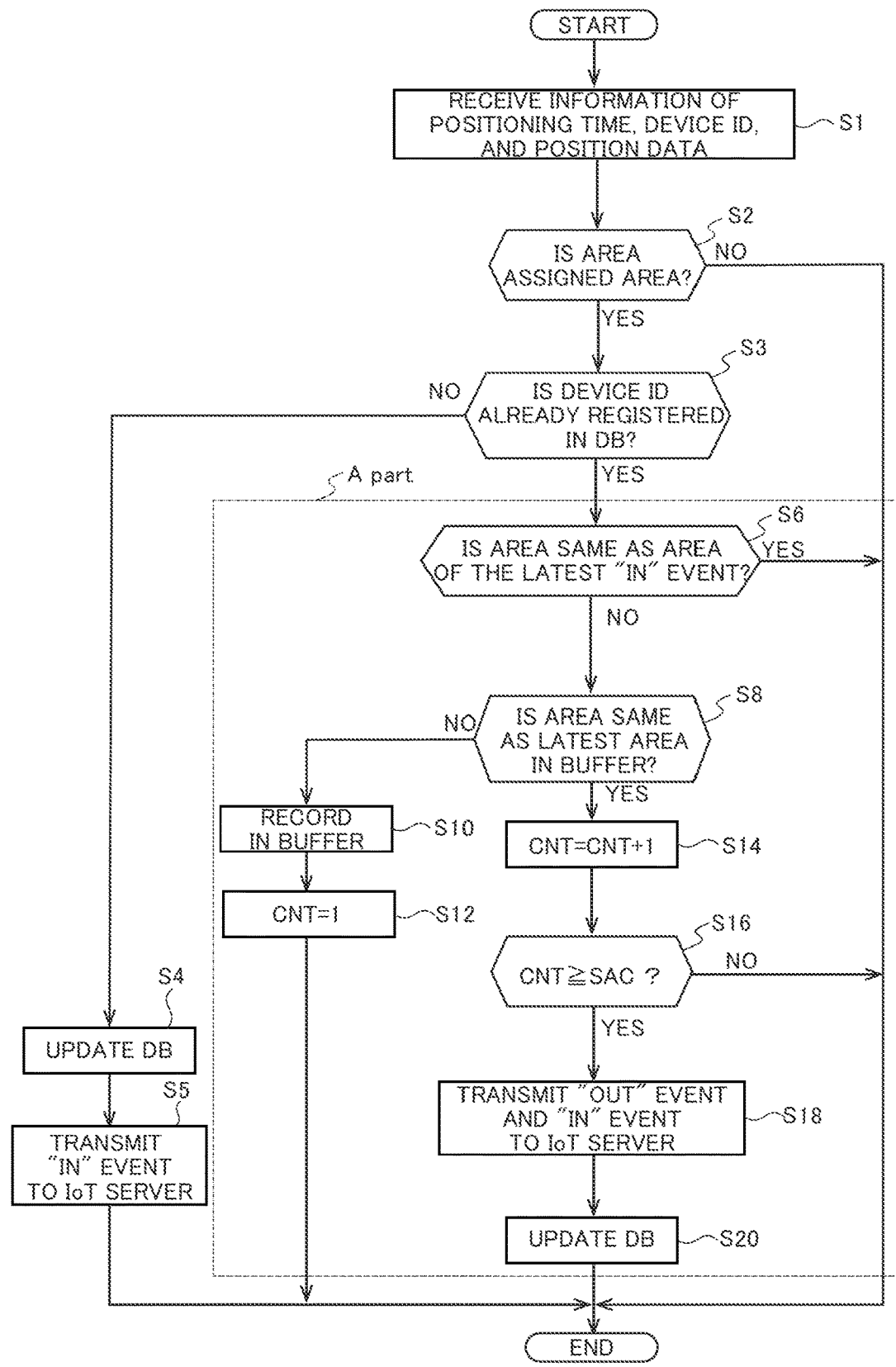
FIG. 9 is an exemplary flowchart of the event detection processing.

FIGS. 8 and 9 are exemplary flowcharts of the event detection processing. FIG. 8 shows operation of the edge devices other than the L1 edge device 51. FIG. 9 shows operation of the L1 edge device 51.

FIGS. 8 and 9 will be described by using an example in which the communication device 2 continuously existing in one of the areas is detected the number of times based on the detection set value (an example of a predetermined number of times of at least two or more), and the communication device 2 is determined as existing in the corresponding area.

(3-1) Operation of Edge Devices Other than L1 Edge Device 51 (FIG. 8)

With reference to FIG. 8, each edge device of the L2 edge device 52, the L3 edge device 53, and the L4 edge device 54 receives information of the positioning time, the device ID, and the position data from the position identification system (step S1). The device ID and the position data are received periodically, for example, every several hundreds of milliseconds.

Each edge device determines whether the position data, which is received in step S1, shows the assigned area (step S2). In more detail, each edge device determines whether the position shown by the received position data (hereinafter called a "current position") is included in one of the areas of the store map of the assigned layer. Each edge device terminates the event detection processing in the case in which the current position is not in the assigned area (step S2: NO), and it advances to step S6 in the case in which the current position is in the assigned area (step S2: YES).

In each edge device, the corresponding event database stores the IN event and the OUT event, per device ID.

In step S6, each edge device determines whether the current position of the communication device 2 is included in the same area as the area of the latest IN event, in the corresponding event database. In the case in which the current position is included in the same area as the area of the latest IN event, there is no occurrence of a new event, and the event detection processing is terminated (step S6: YES). In other words, although after an IN event occurs at a certain area, the communication device 2 continuously existing in this area is detected, this detection result is ignored.

Although the current position is not included in the same area as the area of the latest IN event (step S6: NO), each edge device does not immediately transmit the IN event at the area including the current position of the communication device 2, to the IoT server 6. As described above, in the condition that the communication device 2 continuously existing in the same area is detected the number of times based on the detection set value, each edge device transmits the IN event to the IoT server 6.

Thus, in the case in which the current position of the communication device 2 is not included in the same area as the area of the latest IN event, each edge device records the area ID of the area corresponding to the current position in a buffer and calculates a count value CNT. The count value CNT is a number of times that the communication device 2 of the processing target device ID continuously exists in the corresponding area. Thereafter, each edge device transmits the IN event of the area ID recorded in the buffer, to the IoT server 6, when the count value CNT becomes the detection set value SAC or greater. Then, the corresponding area ID is deleted from the buffer.

Specifically, upon determining that the current position is not included in the same area as the area of the latest IN event (step S8: NO), each edge device records the area ID of the area corresponding to the current position of the communication device 2 in the buffer (step S10) and sets the count value CNT to "1" (step S12).

When the position data is received next time, an area corresponding to the current position shown by this position data may be the same area as the area that is recorded in the buffer last time (step S8: YES). In this case, the count value CNT is counted up by one (step S14), and it is determined whether the count value CNT is the detection set value SAC or greater (step S16).

The processes in steps S8 to S16 are repeated until the count value CNT reaches the detection set value SAC. At the time when the condition in step S8 is not satisfied during the repetition, the count value CNT is returned to "1", and the area ID is newly recorded in the buffer.

In response to the count value CNT reaching the detection set value SAC (step S16: YES), the edge device transmits an OUT event and an IN event to the IoT server 6 (step S18). This OUT event is for the area ID in which the IN state occurs last and is recorded in the event database at this point of time. This IN event is for the area ID that is a processing target of the count value CNT. The edge device then updates own event database so that result of transmitting the OUT event and the IN event will be reflected (step S20). The positioning time when the count value CNT reaches the detection set value SAC is a time of occurrence of the event.

Herein, the OUT event is transmitted prior to the IN event, which enables avoiding a situation in which the communication device 2 is in the IN state in a plurality of areas in the same layer.

In the case in which the count value CNT does not reach the detection set value SAC within a predetermined time, each edge device preferably resets the count value CNT that is counted with respect to the area ID recorded in the buffer. In one example in which the detection set value SAC is set to 5, the count value CNT may not reach 5 although a predetermined time, e.g., 10 minutes, has passed, and this may cause an error. In order to avoid such a situation, in the state in which the count value CNT does not reach the detection set value SAC, for example, within two to three seconds, the current counting is stopped, and it is resumed after the count value CNT for the area ID of the area including the current position is returned to "1". The situation in which the count value CNT does not reach the detection set value SAC within a predetermined time can occur, for example, when the power of the communication device is turned off in the middle of counting.

(3-2) Operation of L1 Edge Device 51 (FIG. 9)

The L1 edge device 51 is an edge device that manages the whole store floor as the area A1, as shown in FIG. 2. The following description focuses on differences between operation of the L1 edge device 51 and operation of the other edge devices (FIG. 8). Note that the A part of the flowchart in FIG. 9 is the same as the A part in FIG. 8.

Upon recognizing that the position shown by the position data of the communication device 2 is in the area A1 of the store map of the layer L1 (step S2: YES), the positioning system 1 of this embodiment preferably registers the device ID of the communication device 2 in the event database that is managed by the L1 edge device 51. In more detail, the L1 edge device 51 preferably records the IN event in the event database without waiting for detection of the communication device 2 continuously existing in the area A1, the number of times based on the detection set value (step S4). Then, the L1 edge device 51 preferably transmits the IN event at the area A1 of the communication device 2 to the IoT server 6 (step S5).

Such processes are performed in order to promptly detect that a customer, corresponding to the communication device 2, certainly exists in the store. Prompt recognition that a customer corresponding to the communication device 2 exists in the store enables controlling so that only the customer existing in the store floor can place an order. This prevents a person outside of the store floor from placing an order maliciously. The area A1 of the store map of the layer L1 is not divided into small areas and is equal to the dimensions of the whole store floor. The IN event is recorded by measuring a position in the area A1 once.

FIG. 8 is described by using a case in which the communication device 2 continuously existing in one of the areas is detected the number of times based on the detection set value, and the communication device 2 is determined as existing in the corresponding area. However, the determination method is not limited thereto.

The determination methods other than that in FIG. 8 will be described with reference to FIGS. 10 and 11.

Figure 10:
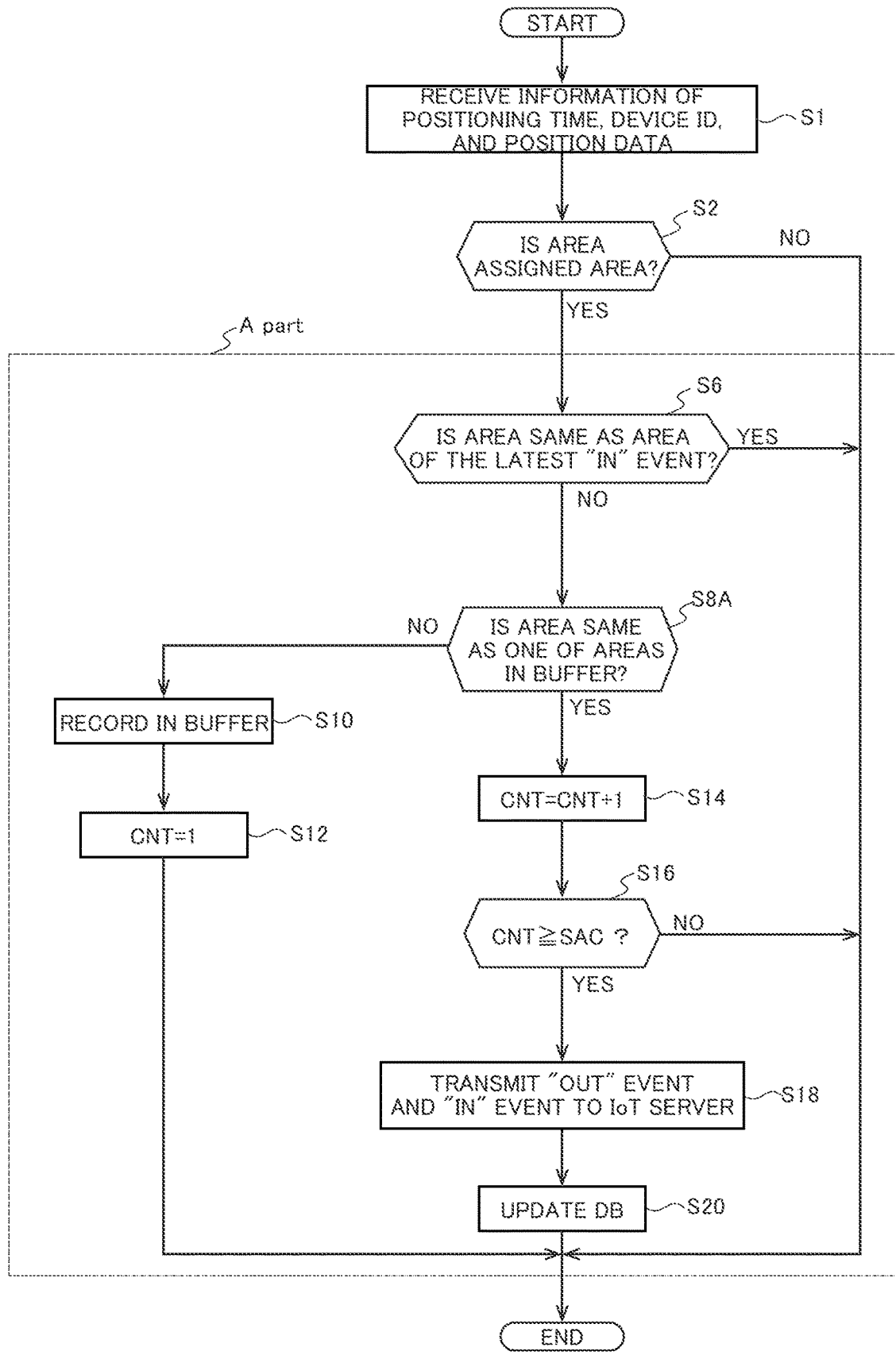
FIG. 10 is another exemplary flowchart of the event detection processing.

FIG. 10 is a flowchart of the event detection processing in the case in which the communication device 2 existing in one of the areas is detected the number of times based on the detection set value, and the communication device 2 is determined as existing in the corresponding area. That is, it is not necessary for the communication device 2 to continuously exist in a certain area, and the communication device 2 is determined as existing in the corresponding area in the case in which it is detected in the certain area multiple times in total that corresponds to the number of times based on the detection set value.

The flowchart in FIG. 10 differs from the flowchart in FIG. 8 in having a step S8A. In the flowchart in FIG. 10, when the communication device 2 existing in an area that is not recorded in the buffer is detected (step S8A: NO), the area ID of this area is recorded in the buffer, and the count value CNT is recorded in association with this area ID. That is, not only the area ID of the latest area, but also the area ID of one or each of the plurality of areas and the corresponding count value CNT are recorded in the buffer. In this state, the IN event corresponding to the area ID that satisfies the condition in step S16, among the area IDs recorded in the buffer, is transmitted to the IoT server 6.

In the flowchart in FIG. 10, the condition for determining that the communication device 2 exists in a certain area is more relaxed than that in the case in FIG. 8. Thus, it is possible to more promptly transmit the IN event at a certain area.

Figure 11:
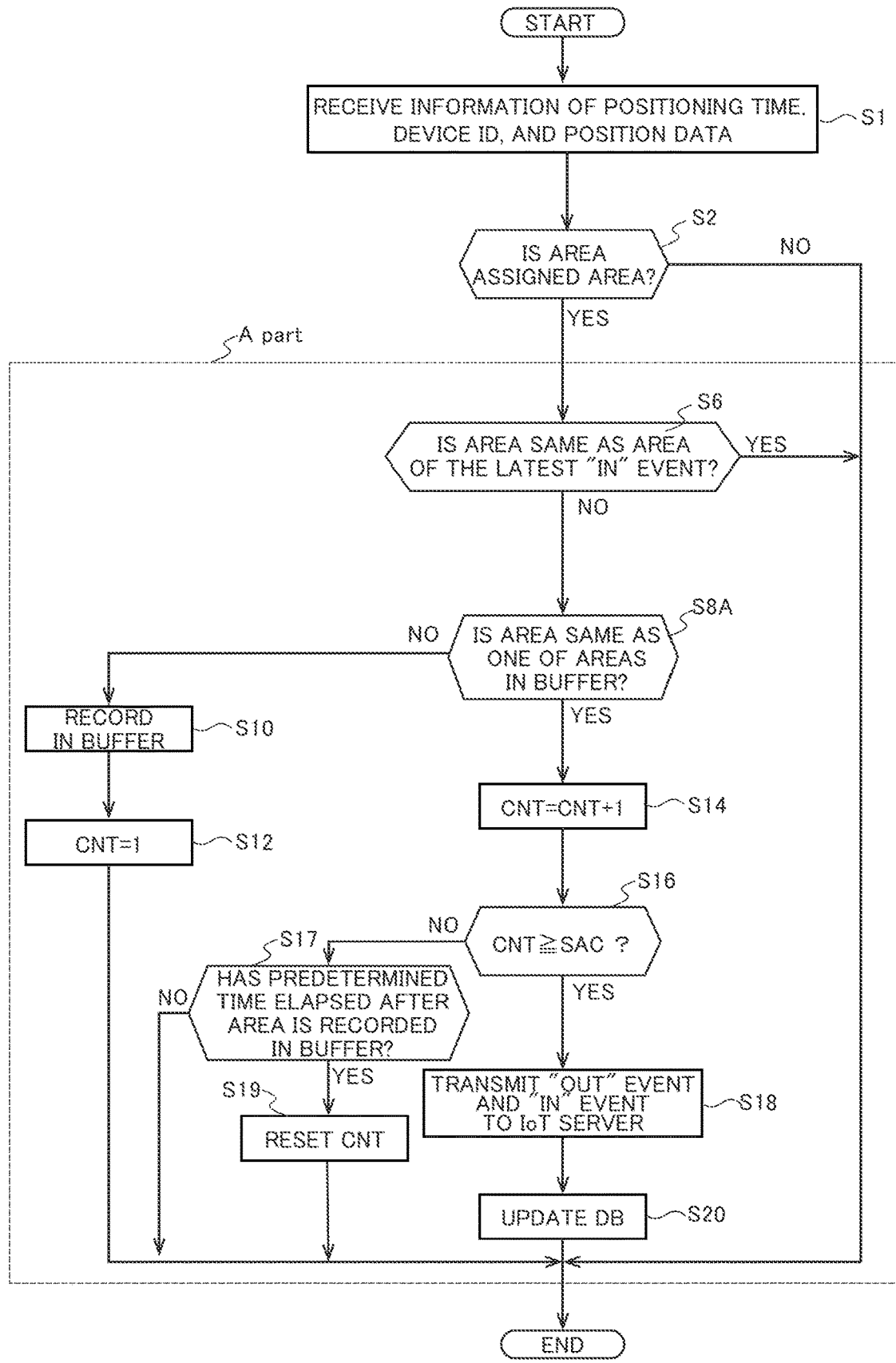
FIG. 11 is yet another exemplary flowchart of the event detection processing.

FIG. 11 is a flowchart of FIG. 10, to which steps S17 and S19 are added.

In the flowchart in FIG. 11, the controller 501 of each edge device functions as a counter. The counter counts up the number of times that the communication device 2 exists in the same area (in other words, calculates the count value CNT) and resets the count value CNT of the corresponding area in the case in which the number of times does not reach the detection set value within a predetermined time.

In the flowchart in FIG. 11, in the state in which the area ID of a certain device ID is still recorded in the buffer although a predetermined time has passed (that is, an IN event does not occur at the area of the area ID) (step S17: YES), the count value CNT of this area ID is reset (step S19). This provides determination accuracy higher than that in the processing of the flowchart in FIG. 10, in determining the communication device 2 as existing in a certain area. For example, in the condition in which the detection set value SAC is 5, the area ID in which the count value CNT is 4 may remain in the buffer for a long time. This may cause wrong determination such that although the communication device 2 has actually already been moved to a position away from the area corresponding to this area ID, the communication device 2 may be wrongly determined as existing in this area (this may cause an error). In consideration of this, with respect to the area ID in which the count value CNT does not reach the detection set value SAC although a predetermined time has passed, it is preferable to reset the count value CNT (that is, reset the count value CNT to 0). In step S19, the area ID in which the count value CNT is reset may be deleted from the buffer.

In addition, in the state in which the count value CNT of each area ID that is recorded in the buffer does not reach the detection set value SAC, the count value CNT of every area ID recorded in the buffer may be reset. After the count value CNT is reset, the number of times that the communication device 2 exists in the area is counted again.

In the flowchart in FIG. 11, step S17 may be performed on the condition that the position data is received a predetermined number of times after an area ID is recorded in the buffer.

(3-3) Processes Related to Existence of Overlap of Areas (FIG. 12)

Next, processes related to existence of overlap of areas will be described. The following describes an example in which the communication device 2 continuously existing in one of the areas is detected the number of times based on the detection set value, and the communication device 2 is determined as existing in the corresponding area.

As described above, each edge device of the edge server 5 independently determines occurrence of an IN event and an OUT event at the assigned area. As a result, the IN state may occur in each area of different layers in an overlapping manner. In this state, the positioning system 1 of this embodiment may or may not allow overlap of areas between different layers.

Figures 12A, 12B:
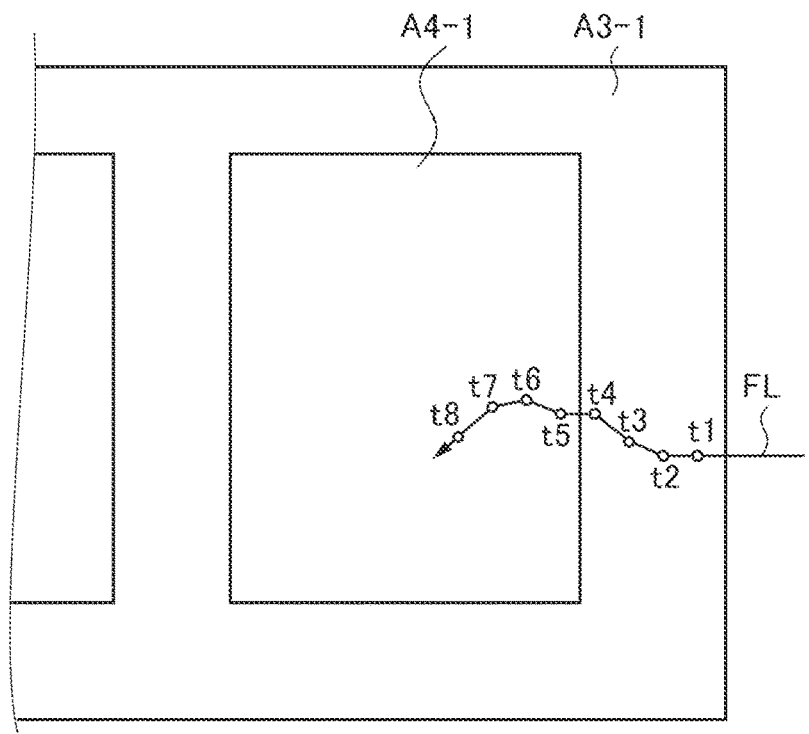
FIGS. 12A and 12B illustrate processes related to existence of overlap of areas.

For example, a flow line FL of the communication device 2 shown in FIG. 12A is assumed. The flow line FL is a flow line of the communication device 2 that moves according to the passage of time t1, t2, t8, and . . . , in this order. The times represent the passage of time as the time goes from t1 to t8, and circle marks shown in FIG. 12A schematically represent positions that are respectively measured at timings of the times t1 to t8. The flow line FL is a line of flow connecting the positions that are respectively measured at timings of the times t1 to t8, in time sequence (in the order from the early time t1 to the later time t8). The area A3-1 is included in the store map of the layer L3. The area A4-1 is included in the store map of the layer L4 and is included within the area A3-1.

FIG. 12B shows occurrences of events based on the exemplary flow line FL in FIG. 12A, in the case in which there is overlap of areas (that is, overlap of areas is allowed) and in the case in which there is no overlap of areas (that is, overlap of areas is not allowed). In this example, the detection set value SAC that is set for each of the areas A3-1 and A4-1 is "3".

When the communication device 2 that has entered the area A3-1 at time t1 is detected in the area A3-1 three times at times t1 to t3, the IN event at the area A3-1 is recorded in the event database. Then, in response to detection that the communication device 2 that has entered the area A4-1 at time t5 exists in the area A4-1 three times at times t5 to t7, the IN event at the area A4-1 is recorded in the event database. In this situation, in the case of allowing overlap of areas, the communication device 2 is in the IN state in both of the areas A3-1 and A4-1 after time t7.

On the other hand, in the case of not allowing overlap of areas, the OUT event at the area A3-1 is recorded in the event database at time t7 when the IN event at the area A4-1 occurs. This prevents the IN state from occurring in both of the areas A3-1 and A4-1 in an overlapping manner after time t7.

In the case of not allowing overlap of areas, the edge server 5 may generate an OUT event, or the IoT server 6 may generate an OUT event upon receiving an IN event. Specifically, in the case of generating an OUT event by the edge server 5 in the example shown in FIGS. 12A and 12B, the OUT event at the area A3-1 is transmitted to the IoT server 6, and the IoT server 6 records this OUT event in the event database. In the case of generating an OUT event by the IoT server 6, the IoT server 6 determines overlap of the areas and records the OUT event in the event database.

After the communication device 2 is moved from one area to another area in the store map of the same layer, existence of the communication device 2 in the another area may be detected the number of times based on the detection set value SAC. In this case, as shown in FIG. 8, the OUT event at the one area in which the position is measured prior to positioning in the another area, and the IN event at the another area, are transmitted. In short, in the store map of the same layer, the OUT event at the preceding area is transmitted at the time the existence in another area is detected the number of times based on the detection set value.

In addition, in the condition in which the detection set value differs between different layers, control can be performed so as to generate the OUT event before generating the IN event at any time, in order to avoid occurrence of the OUT event before the IN event is generated.

In each edge device, the detection set value for determining the IN event and the detection set value for determining the OUT event can be set to different values, with respect to a certain area. In these conditions, the IN event at another area may be detected (occur) prior to the OUT event at a certain area. In this case, the IN event may be given priority, and the OUT event at the certain area may be forcibly generated. This avoids the communication device 2 being in the IN state in two or more areas at the same time.

In addition, it is not essential to generate the OUT event, and only the IN event may be recorded in the event database.

(4) Operation of Positioning System 1

Next, operation of the positioning system 1 of this embodiment in displaying the position of the communication device 2 will be described with reference to FIGS. 13 to 14B.

Figure 14A:
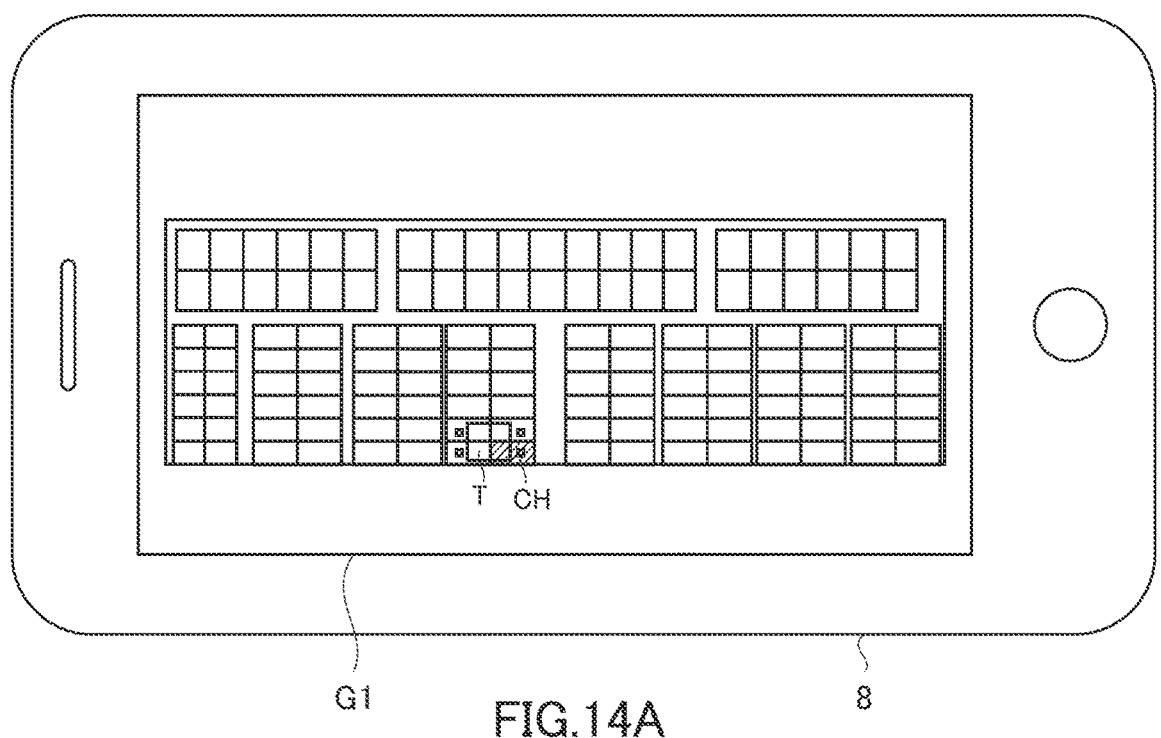
FIGS. 14A and 14B show examples of displaying position information of a communication device on a store communication terminal.

FIG. 13 is an example of a sequence chart showing operation of the positioning system 1 of this embodiment. FIGS. 14A and 14B show examples of displaying position information of the communication device 2 on a store communication terminal.

Upon receiving a request for information of the position of a customer, specifying a device ID, from the store application of a store communication terminal (not shown) (step S30), the application server 7 inquires the IoT server 6 of position information (step S32). The position information request from the store communication terminal contains a terminal ID for identifying the source store communication terminal and the device ID that is a request target of the position information. The inquiry that is transmitted to the IoT server 6 in step S32 provides the device ID that is contained in the position information request from the store communication terminal is provided.

In response to the inquiry, the IoT server 6 refers to the event database to identify the area in which the communication device 2 of the device ID provided in the inquiry is in the IN state at the point of time of receiving the inquiry (step S34). Then, the IoT server 6 returns a response containing the area ID of the identified area, to the application server 7 (step S36). At this time, the IN state of the communication device 2 of the processing target device ID may be recorded with respect to a plurality of layers. In such a case, the IoT server 6 identifies the areas of all layers in which the IN state occurs and add the area IDs of the identified areas in the response.

The application server 7 generates display data based on the area ID contained in the response, which is received in step S36 (step S38). The application server 7 then transmits the display data to the store communication terminal (an example of a communication terminal) corresponding to the terminal ID provided in the position information request in step S30 (step S40). The store communication terminal displays, for example, an image as illustrated in FIG. 14A or 14B, on the display panel, based on the received display data (step S42).

In generating display data in step S38, a plurality of area IDs may be contained in the response in step S36. In this case, the display data is generated based on the area ID corresponding to the smallest area among the plurality of area IDs. In short, the display data is generated so that an area of a layer having higher resolution (in the order of L4, L3, L2, and L1) will be preferentially displayed.

In one example, FIG. 14A shows a screen G1 of a store communication terminal 8 in the state in which the IN state in the layer L4 is determined. The screen G1 shows a plan view of the store based on the store map of the layer L4 and includes each rectangular piece that corresponds to one area. As partially shown in the screen G1, furnishings in the store, such as tables "T" and chairs CH, may be shown in the store map.

FIG. 14A assumes that reception environment of radio waves from the communication device 2 is good. Thus, the communication device 2 of a certain device ID is in the IN state in a certain area in the layer L4. In this case, the IN state is determined also in the areas of the layers L1 to L3, but the area of the layer L4 having the highest resolution of the position of the communication device 2 (that is, a smaller area) is displayed on the store communication terminal 8 so as to be distinguishable from other areas. Specifically, the IN state of the certain communication device 2 is shown in the hatched area in the screen G1. In actual operation, in order to enable distinguishing a plurality of areas in which communication devices of a plurality of customers are in the IN state, from each other, the device ID of the communication device in each area is preferably displayed together. In the screen G1, the position of a customer is identified in the unit of a chair, whereby a worker of the store can deliver the food and drink ordered by each customer, without fail.

Figure 14B:
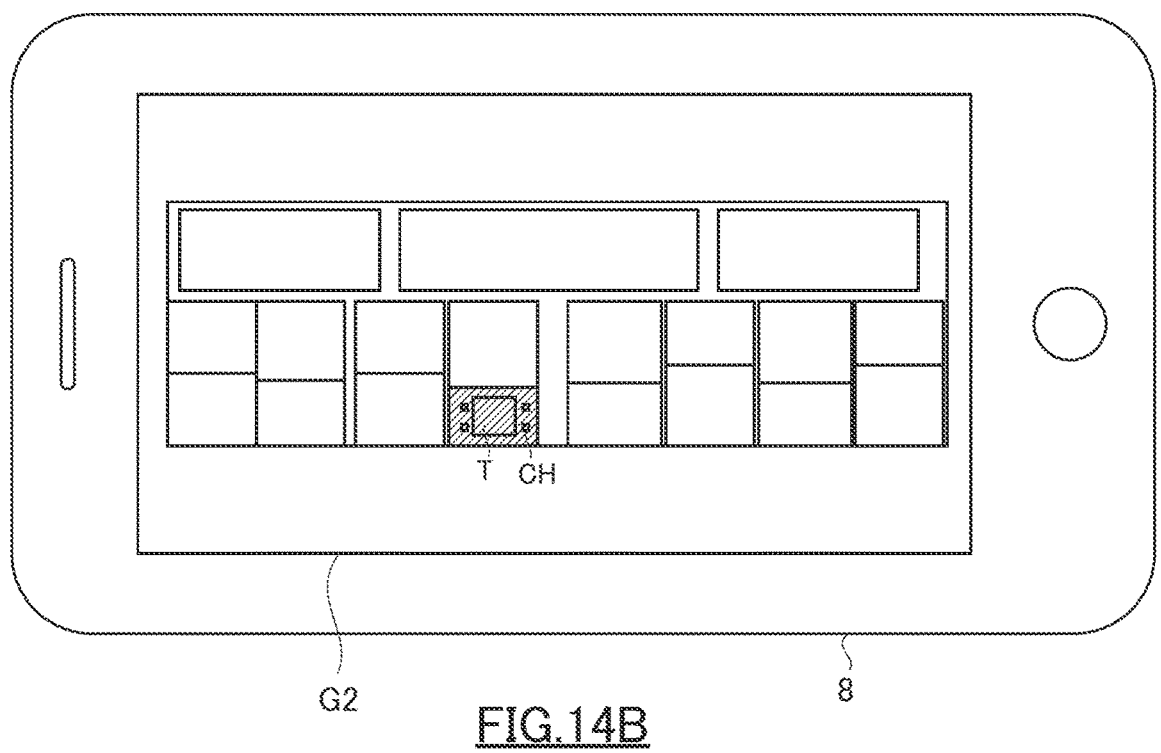

On the other hand, FIG. 14B shows a screen G2 of a store communication terminal 8 in the state in which the IN state in the layer L3 is determined. The screen G2 shows a plan view of the store based on the store map of the layer L3 and includes each rectangular piece that corresponds to one area. As partially shown in the screen G2, furnishings in the store, such as tables "T" and chairs CH, may be shown in the store map. FIG. 14B assumes that reception environment of radio waves from the communication device 2 is not such good as in the case in FIG. 14A. In more detail, FIG. 14B assumes that the communication device 2 of a certain device ID is not in the IN state in the area of the layer L4, but it is in the IN state in a certain area of the layer L3. In this case, the IN state is determined also in the areas of the layers L1 and L2, but the area of the layer L3 having the highest resolution of the position of the communication device 2 (that is, a smaller area) is displayed on the store communication terminal 8 so as to be distinguishable from other areas. Specifically, the IN state of the certain communication device 2 is shown in the hatched area in the screen G2. In actual operation, in order to enable distinguishing a plurality of areas in which communication devices of a plurality of customers are in the IN state, from each other, the device ID of the communication device in each area is preferably displayed together.

The method of displaying a certain area in a distinguishable manner is not limited. For example, it is possible to display a certain area by making a difference in color, brightness, pattern, or the like, between the certain area and other areas.

The table at which a customer stays is reliably identified even in the display of the screen G2, and thus, a worker of the store can smoothly deliver the food and drink to the customer without fail.

Although FIGS. 14A and 14B show cases of displaying the store map of only one layer on a store communication terminal, the number of the layers is not limited thereto. The store maps of a plurality of layers may be displayed in split screens on a store communication terminal. In this case, the area in which the communication device is in the IN state may be displayed so as to be distinguishable from other areas of the same layer, in the store map of each layer.

In the case of displaying the store maps of two or more layers, the store map of each layer may be small and be difficult to see on only one display screen. In view of this, each store map may be displayed one by one on the display screen by scrolling, or store maps may be switched to be displayed on the display screen in response to a predetermined screen-switching operation.

As described above, in the positioning system 1 of this embodiment, the edge devices of the edge server 5 continuously acquire the position data of the communication device 2 from the position identification system and determine whether the communication device 2 exists in the area included in the respective store maps of the plurality of layers. In this determination process, in response to detection that the communication device 2 exists in one of the plurality of areas, the number of times based on the detection set value, the communication device 2 is determined as existing in the corresponding area. This enables outputting a result of positioning the communication device 2 in accordance with reception environment of radio waves from the communication device 2. For example, the position of the communication device 2 is measured with high accuracy when reception environment of radio waves from the communication device 2 is good. Meanwhile, even when reception environment of radio waves from the communication device 2 is not very good, it is possible to show a range where the communication device 2 certainly exists, although accuracy (resolution) is relatively low. Thus, it is possible to enhance reliability of the position information of the communication device 2 in measuring the position of the communication device 2, for example, in an indoor space.

In the determination process, in response to detection that the communication device 2 continuously exists in one of the plurality of areas, the number of times based on the detection set value, the communication device 2 may be determined as existing in the corresponding area. This improves accuracy of determining that the communication device 2 exists in the corresponding area.

Although embodiments of the information processing apparatus, the information processing system, the program, and the information processing method of the present invention are described above, the present invention should not be limited to the foregoing embodiments. In addition, the embodiments described above can be variously modified and altered within the scope not departing from the gist of the present invention.

In one example, although the foregoing embodiments describe a case of using four layers, but the number of the layers is not limited thereto. The number of the layers can be set to any value of two or more.

The number of the layers may be one. The processing in this case is performed in a similar manner as described above. That is, in response to detection that the communication device 2 exists in one of the plurality of areas included in the store map of one layer, the number of times based on a predetermined detection set value, the communication device 2 is determined as existing in the corresponding area, in a similar manner as described above.

Although the foregoing embodiments describe an example of assuming a store, such as a restaurant, for the positioning system 1, the type of business to which the positioning system 1 is employed is not specifically limited. The positioning system 1 can be employed for any purpose that requires measuring the position of a user who carries a communication device.

Although the foregoing embodiments describe an example of employing the positioning system 1 in an indoor space, such as a restaurant, the positioning system 1 can be used in a desired place. The present invention can be used in each of indoor and outdoor spaces.

The invention claimed is:

1. An information processing apparatus comprising:
a processor configured to acquire position information of a communication device; and
a storage configured to store first map information and second map information, the first map information indicating a plurality of first partial areas that divide an area in which the communication device is movable, the second map information indicating a plurality of second partial areas that divide the area, each of the plurality of second partial areas being smaller than each of the plurality of first partial areas; wherein:
the processor is further configured to:
in a case in which the processor acquires position information a predetermined number of times of at least two or more, in a first partial area of the plurality of first partial areas, based on the first map information, determine that the communication device exists in the first partial area, and
in a case in which the processor acquires position information a predetermined number of times of at least two or more, in a second partial area of the plurality of second partial areas, based on the second map information, determine that the communication device exists in the second partial area.

2. The information processing apparatus according to claim 1, wherein the predetermined number of times is a detection set value that is variable.

3. The information processing apparatus according to claim 2, wherein the detection set value can be set with respect to each first partial area of the plurality of first partial areas or each second partial area of the plurality of second partial areas.

4. The information processing apparatus according to claim 2, wherein:
the processor is configured to:
in a case in which position information is continuously acquired at least a number of times equal to the detection set value, in a first partial area of the plurality of first partial areas, determine that the communication device exists in the first partial area, and
in a case in which position information is continuously acquired at least a number of times equal to the detection set value, in a second partial area of the plurality of second partial areas, determine that the communication device exists in the second partial area.

5. The information processing apparatus according to claim 1, wherein:

the processor is configured to, when the communication device moves from a subject first partial area to another first partial area in the plurality of first partial areas:
upon determining that the communication device exists in the subject first partial area, determine that an entering event occurs, the entering event indicating that the communication device has entered the subject first partial area; and
upon determining that the communication device exists in another first partial area other than the subject first partial area after the entering event occurs, determine that a leaving event occurs, the leaving event indicating that the communication device has left the subject first partial area.

6. The information processing apparatus according to claim 1, wherein:
the processor is configured to, when the communication device moves from a subject second partial area to another second partial area in the plurality of second partial areas:
upon determining that the communication device exists in the subject second partial area, determine that an entering event occurs, the entering event indicating that the communication device has entered the subject second partial area, and
upon determining that the communication device exists in another second partial area other than the subject second partial area after the entering event occurs, determine that a leaving event occurs, the leaving event indicating that the communication device has left the subject second partial area.

7. The information processing apparatus according to claim 5, wherein the processor is further configured to output event type information of at least one of the entering event and the leaving event that has been determined.

8. The information processing apparatus according to claim 7, wherein the processor is further configured to count time, and to output time and the event type information in an associated manner.

9. The information processing apparatus according to claim 8, wherein time that is associated with the event type information is a time when the communication device is determined as existing in the first partial area or the second partial area.

10. The information processing apparatus according to claim 5, wherein the processor is configured to, in response to occurrence of the entering event at the another first partial area before the leaving event at the subject first partial area occurs, forcibly generate the leaving event at the subject first partial area.

11. The information processing apparatus according to claim 1, wherein:
the processor is further configured to:
count a number of times that the position information acquired by the processor indicates that the communication device exists in the first partial area or the second partial area and
reset the number of times that has been counted with respect to the first partial area or the second partial area, in a case in which the number of times does not reach the predetermined number of times within a predetermined time.

12. The information processing apparatus according to claim 11, wherein the processor is configured to restart counting a number of times that the communication device exists in the first partial area or the second partial area, after resetting the counted number of times.

13. An information processing system comprising:
the information processing apparatus according to claim 1; and
a communication terminal configured to communicate with the information processing apparatus;
wherein the communication terminal is configured to display a first partial area or a second partial area in which the communication device is determined as existing, the predetermined number of times, so that the first partial area or the second partial area is visually distinguished from other first partial areas or other second partial areas.

14. The information processing system according to claim 13, wherein, when the communication terminal requests position information of the communication device to an information processing terminal, the information processing apparatus causes the communication terminal to display position information of the communication device in the second map information, in a condition in which the communication device is determined as existing in both of the first partial area and the second partial area.

15. The information processing system according to claim 13, wherein, when the communication terminal requests position information of the communication device to the information processing terminal, the information processing apparatus causes the communication terminal to display position information of the communication device in the first map information and in the second map information, in a condition in which the communication device is determined as existing in both of the first partial area and the second partial area.

16. The information processing system according to claim 13, further comprising:
a locator configured to receive a radio wave that is emitted from the communication device; and
a position identification device configured to measure a position of the communication device based on an angle of arrival of the radio wave that is received by the locator;
wherein the information processing apparatus is configured to acquire position information of the communication device from the position identification device.

17. A non-transitory computer-readable storage medium recording a program, the program configured to, when installed in a computer, execute a predetermined method comprising:
acquiring position information of a communication device;
in a case of acquiring position information at least two or more times, in a first partial area of a plurality of first partial areas, determining that the communication device exists in the first partial area, based on first map information indicating the plurality of first partial areas that divide an area in which the communication device is movable; and
in a case of acquiring position information at least two or more times, in a second partial area of a plurality of second partial areas, based on second map information indicating the plurality of second partial areas that divide the area, determining that the communication device exists in the second partial area, wherein each of the plurality of second partial areas is smaller than each of the plurality of first partial areas.

18. An information processing method comprising:
acquiring position information of a communication device;
in a case of acquiring position information at least two or more times, in a first partial area of a plurality of first partial areas, determining that the communication device exists in the first partial area, based on first map information indicating the plurality of first partial areas that divide an area in which the communication device is movable; and
in a case of acquiring position information at least two or more times, in a second partial area of a plurality of second partial areas, based on second map information indicating the plurality of second partial areas that divide the area, determining that the communication device exists in the second partial area, wherein each of the plurality of second partial areas is smaller than each of the plurality of first partial area.

19. The information processing apparatus according to claim 6, wherein the processor is further configured to output event type information of at least one of the entering event and the leaving event that has been determined.

20. The information processing apparatus according to claim 19, wherein the processor is further configured to count time, and to output time and the event type information in an associated manner.

21. The information processing apparatus according to claim 1, further comprising a receiver configured to receive a radio wave emitted from the communication device, wherein the processor is configured to acquire position information of the communication device based on the radio wave received from the communication device.

* * * * *